April 7, 1936.  C. P. POTTER  2,036,718
GAME DEVICE
Original Filed Oct. 23, 1933
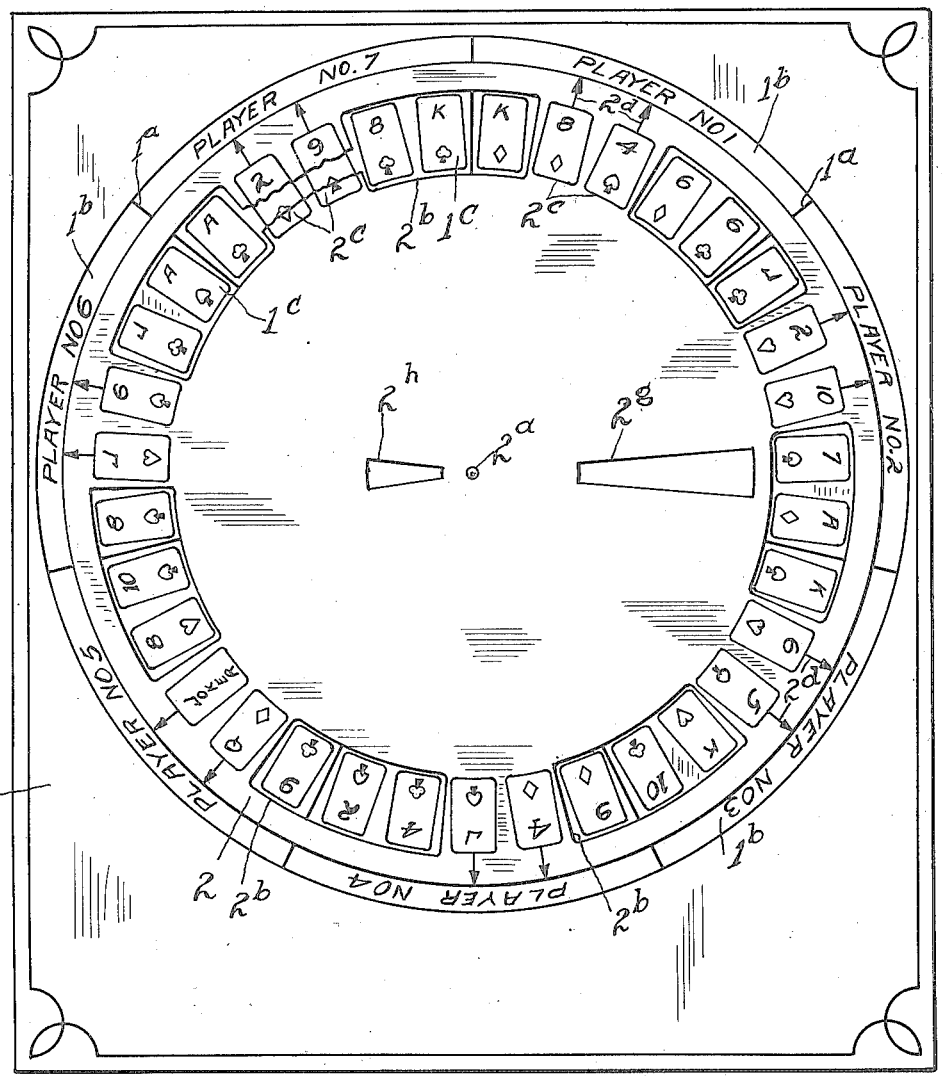
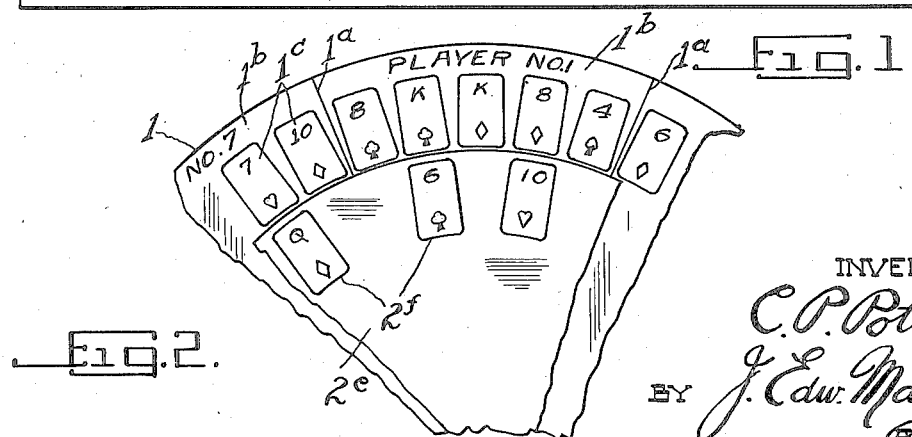
INVENTOR
C. P. Potter
BY J. Edw. Maybee
ATTY Patented Apr. 7, 1936

2,036,718

UNITED STATES PATENT OFFICE 2,036,718

GAME DEVICE

Charles P. Potter, Toronto, Ontario, Canada

Application October 23, 1933, Serial No. 694,776
Renewed September 23, 1935

6 Claims. (Cl. 273—142)

This invention relates to game devices and more particularly to devices which may be operated in accordance with the rules of various games such as those in which playing cards, dice and the like are employed to indicate different hands, and my object is to provide a device of this character in which the different hands or combinations are simultaneously obtained by one operation of a single rotor.

I attain my object by dividing a stator into a plurality of substantially equal sectors having different combinations of game indicia arranged circumferentially thereof. On the stator is journalled a rotor which is also provided with different combinations of similar indicia arranged circumferentially thereof. The number of combinations of indicia on the rotor corresponds to the number of combinations of indicia on the stator or to the number of sectors, but the number of indicia in each combination on the rotor differs from the number of indicia in each sector. The indicia on the rotor are spaced apart circumferentially to register with the same number of indicia in each sector so that the indicia on the rotor may be substituted for the stator indicia in register therewith.

The construction is hereinafter more fully described and is illustrated in the accompanying drawing in which:

Fig. 1 is a plan view of my device showing the indicia on the rotor covering a corresponding number of indicia in each sector; and Fig. 2 a plan view of part of a modified form of the device.

$I$ is a stator which is divided by the radial marks $I^a$ into a plurality of substantially equal sectors $I^b$. The different sectors have different combinations of game indicia $I^c$ representating different poker hands. The indicia $I^c$ are arranged concentric to a center $2^a$ and are spaced substantially equally in each sector.

A rotor $2$ is journalled on a suitable pin which passes through the center $2^a$. The rotor in Fig. 1 is provided with cut-away portions $2^b$ corresponding in number to the number of sectors $I^b$ and adapted to expose the same number of indicia $I^c$ in each of the sectors. Between the cut-away portions, the rotor carries different combinations of game indicia $2^c$ similar to the indicia $I^c$. The indicia $2^c$ are arranged and spaced circumferentially of the rotor to cover the indicia $I^c$ in each sector $I^b$ underlying the indicia $2^c$. It will be understood that the cut-away portions will be equally spaced apart so that the correspondingly positioned indicia $I^c$ in each of the sectors will be exposed when the rotor comes to rest.

Each player selects a sector $I^b$ before or during the spinning of the rotor and when the rotor stops the different hands are readily determined by using the exposed indicia $I^c$ in each sector and the indicia $2^c$ on the rotor within the boundaries of each sector. In other words, the indicia $2^c$ on the rotor are substituted for the indicia $I^c$ covered thereby. Each of the indicia $2^c$ is provided with an arrow $2^d$ leading out to the periphery of the rotor so that the arrows will be adjacent the boundary marks $I^a$ of the sectors. If the rotor comes to rest with the indicia $2^c$ positioned adjacent the boundary marks, the arrows will readily determine which of the indicia $2^c$ are to be used with the indicia $I^c$ in each sector.

In the event that two of the indicia $I^c$ are partly exposed, that which is most exposed will be selected if there is any difference in the degree of exposure. If two are equally exposed, an agreement must be arrived at to determine which should be counted.

It will be obvious that the cut-away portions may be formed as notches in the periphery of the rotor instead of slots as shown in Fig. 1 and that the same results may be obtained by making the rotor $2^e$ so that it does not cover the indicia $I^c$. See Fig. 2. In this case the rotor indicia $2^f$ are substituted for the indicia $I^c$ in register therewith. The indicia $2^f$ are shown spaced apart and it will be understood that the spacing of the indicia in each set and the spacing of the sets will be uniform around the rotor.

Instead of using representations of poker hands in the sectors, representations of the six sides of dice may be used, in which case the rotor would expose one indicia in each sector and carry one indicia for each sector to complete the combination.

It will be understood that various other arrangements and combinations may be substituted for those shown and described without departing from the spirit of my invention.

If desired the stator $I$ may be provided with well known recipes and the names thereof which will be diametrically opposite one another. The rotor $2$ will be provided with diametrically opposite slots $2^g$ and $2^h$ for exposing one of the recipes and the name of it simultaneously when the rotor comes to rest.

What I claim as my invention is:

1. A game device comprising a stator marked off into substantially equal sectors, each sector having a series of game indicia circumferentially arranged and spaced substantially equally in each sector; and a rotor concentrically mounted on said stator for rotation thereon and having cut away portions corresponding in number to the sectors for exposing the same number of indicia in each sector, the rotor having portions intermediate the cut away portions carrying indicia for covering the underlying indicia, on the stator.

2. A game device comprising a stator marked off into substantially equal sectors, each sector having a series of game indicia circumferentially arranged and spaced substantially equally in each sector; and a rotor concentrically mounted on said stator for rotation thereon and superimposed on the stator and having similar indicia spaced circumferentially of the rotor to cover the same number of indicia in each of the sectors, the rotor having cut away portions to expose the other indicia in each sector.

3. A game device comprising a stator marked off into substantially equal sectors, each sector having a series of game indicia circumferentially arranged and spaced substantially equally in each sector; and a rotor concentrically mounted on said stator for rotation thereon and superimposed on the stator and having slots spaced circumferentially of the rotor to expose the same number of indicia in each sector, the rotor having indicia similar to the first mentioned indicia located between the slots and spaced circumferentially of the rotor to cover the same number of indicia in each of the said sectors so that the indicia on the rotor will be substituted for the covered indicia in each sector.

4. A game device comprising a stator marked off into substantially equal sectors, each sector having a series of circumferentially arranged card indicia representing a poker hand; and a disk concentrically mounted on said stator for rotation thereon and having cut away portions adapted to expose a plurality of the indicia in each sector, the disk having circumferentially arranged card indicia located between the cut away portions for covering the same number of the first mentioned card indicia in each of the sectors so that the card indicia on the disk will be substituted for the covered indicia on the stator.

5. A game device comprising a stator marked off into substantially equal sectors, each sector having a series of five circumferentially arranged card indicia representing a poker hand; and a disk concentrically mounted on said stator for rotation thereon and having cut away portions adapted to expose three of the indicia in each sector, the disk having two circumferentially arranged card indicia located between adjacent cut away portions for covering two of the first mentioned card indicia of each sector so that the card indicia on the disk located between the boundary marks of each sector will be substituted for the covered indicia on the stator.

6. A game device comprising a stator marked off into substantially equal sectors, the different sectors having different combinations of game indicia representing different poker hands arranged circumferentially thereof; and a rotor concentrically mounted on said stator for rotation thereon and having cut away portions adapted to expose the same number of indicia in each of the sectors and having different combinations of similar indicia arranged circumferentially thereof, the indicia in each combination on the rotor differing in number from that of the indicia in each combination on the stator and being located between the cut away portions to cover the underlying indicia in each sector.

CHARLES P. POTTER.